(12) United States Patent
Meeussen et al.

(10) Patent No.: US 6,222,173 B1
(45) Date of Patent: Apr. 24, 2001

(54) IMAGE SHARPENING AND RE-SAMPLING METHOD

(75) Inventors: Dirk Meeussen, Bornem; Bart Tytgat, Grimbergen, both of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/169,585

(22) Filed: Oct. 9, 1998

Related U.S. Application Data

(60) Provisional application No. 60/071,644, filed on Jan. 16, 1998.

(30) Foreign Application Priority Data

Oct. 9, 1997 (EP) .................................................. 97203138

(51) Int. Cl.$^7$ .................................................. H01L 27/00
(52) U.S. Cl. ........................................ 250/208.1; 382/279
(58) Field of Search ........................ 250/208.1; 358/443, 358/445, 451, 452; 348/392, 399; 382/279, 280, 297, 300

(56) References Cited

U.S. PATENT DOCUMENTS

| | | | |
|---|---|---|---|
| 4,969,043 | * 11/1990 | Pothier | 358/213.27 |
| 5,008,752 | 4/1991 | Van Nostrand | 358/160 |
| 5,168,375 | * 12/1992 | Reisch et al. | 358/432 |
| 5,347,590 | 9/1994 | Nonnweiler et al. | 382/6 |
| 5,410,616 | 4/1995 | Kidd | 382/47 |
| 5,627,953 | 5/1997 | Yen | 395/139 |
| 5,666,391 | 9/1997 | Ohnesorge et al. | 378/7 |

FOREIGN PATENT DOCUMENTS

| | | |
|---|---|---|
| 0396517 | 7/1990 | (EP) . |
| 9000780 | 1/1990 | (WO) . |

* cited by examiner

*Primary Examiner*—Que T. Le
(74) *Attorney, Agent, or Firm*—Baker Botts L.L.P.

(57) ABSTRACT

Image processing method wherein an image is re-sampled and sharpened by subjecting the image to a convolution with a kernel, the elements of which are determined by selecting a first set of kernel values so that a convolution of the image by means of a kernel with said first set of kernel values generates a sharpened image, and subsequently interpolating between the elements of this first kernel.

7 Claims, 2 Drawing Sheets

IMAGE SHARPENING AND RE-SAMPLING METHOD

This application claims the benefit of provisional application Ser. No. 60/071,644, filed Jan. 16, 1998.

FIELD OF THE INVENTION

The present invention relates to digital image processing. The invention more specifically relates to sharpening and re-sampling of medical images.

STATE OF THE ART

In several medical imaging techniques, a visible image of an object under examination is generated by means of thermal reproduction techniques such as dry thermal printing.

The sharpness of the reproduced images, especially when they are reproduced on a transparent thermal sensitive medium is not always adequate for medical diagnosis. The images are considered un-sharp or not crispy.

The degree of un-sharpness experienced by the viewer, e.g. the physician or the radiologist may depend on the kind of image that has been reproduced, on the perception of the viewer, on the characteristics of the image acquisition etc.

The un-sharpness (also referred to as smoothing) may be caused by thermal effects that have occurred in the thermal reproduction device such as heat distribution among the thermal elements of the thermal head part of the printer. It may also be caused by slow temperature increase and decrease of the heating elements in the thermal head. Although compensation for these effects is often provided, it may still not eliminate all non-uniformities.

Still other causes of un-sharpness may occur.

Furthermore, when images acquired by a digital image acquisition apparatus are reproduced, there is often a need for re-scaling of the pixel matrix. Images may need to be re-scaled for example because the pixel matrix of the acquired digital image does not match with the pixel matrix provided by a reproducing apparatus by means of which a hard copy of the digital image will be produced. Also lay-out requirements such as reproduction of a multiplicity of images on a single film (often applied in tomography), may demand for image re-scaling.

The above problems, i.e. sharpening and re-scaling, have been addressed separately in the prior art.

Sharpening techniques are known according to which (a) digital spatial convolution filter(s) is(are) applied to the digital image. These digital spatial convolution filters used for image sharpening do not provide re-sampling nor image scaling.

An example of such a technique is the unsharp masking technique wherein smoothing low pass filters such as mean filters, Gaussian filters etc. are used.

Another example consists of the application of a highpass filter such as the Laplacian or Gaussian filter.

In the prior art also image processing techniques are known which are based on a digital spatial interpolating convolution to be applied to images, e.g. scaled image, for creating intermediate pixels in between the pixels of the original pixel matrix of an image.

An example of such a technique is referred to as high resolution cubic spline interpolation.

However, images often need to be re-scaled in addition to being sharpened.

Application of the prior art methods requires both problems to be tackled separately, i.e. one after the other. The prior art solutions hence are computationally expensive, they demand a lot of processing time and are hence not adapted for use in medical imaging where a physician wants to dispose of a hard copy image as soon as possible after examination in order to make a diagnosis.

OBJECTS OF THE INVENTION

It is thus an object of the present invention to provide a method of sharpening and re-scaling an image that can be performed fast and that does not demand a lot of processing time.

It is a further object to provide such a method that can easily be adapted to different kinds of images as well as to the user's taste.

It is still a further object to provide such a method of sharpening and re-scaling that is adapted to the requirements of medical imaging.

Further objects of the invention will become apparent from the description given below.

SUMMARY OF THE INVENTION

The objects of the present invention are achieved by a method according to claim 1.

The method of the present invention is applicable to images provided by means of a digital signal representation.

Although the method was specifically developed for application to medical images, it can be applied to all kinds of images that require image sharpening and for which varying image scaling or re-sampling is desired.

The method can be implemented by software as well as by a mixed hardware-software embodiment.

The method provides a simple implementation of a combined image sharpening and image re-sampling technique. In medical environments such as hospitals, physicians want to be able to make a diagnosis on a hard copy image as soon as possible after an examination. Care is thus taken to use a fast hard copy system such as the dry imaging system and to use a fast working image processing system such as the processing of the present invention which is computationally less expensive than the prior art techniques. It provides enhanced images in fast and accurate way and is thus very well suited for use in a medical environment.

The method of the present invention does not introduce unwanted artifacts e.g. due to aliasing, overshoots, contouring etc. Consequently it does not have any negative influence on the diagnosis.

The method of the invention makes use of either a one or a two-dimensional kernel.

When a two-dimensional kernel is used, the image can be filtered in a single pass, whereas the use of one-dimensional kernels implies two passes, one for a first, e.g. horizontal filtering and one for a second, e.g. vertical filtering of a two-dimensional image.

In a preferred embodiment (down-loadable) convolution tables are used so that the image processing characteristics can be easily adapted to different kinds of images or to the taste of the user.

According to the invention the kernel elements are obtained by selecting a first set of kernel values so that a convolution of the image by means of a kernel with said first set of kernel values generates a sharpened image and interpolating between kernel values of the first set.

The interpolation preferably is based on a third order function. Preferably a cubic spline interpolation between the values of the first kernel is used such that a desired interpolation function is approximated. The desired interpolation function is preferably a sin x/x function.

In order to be able to obtain said approximation, the following constraints must be applied:

- in case of a scaling factor equal to 1/1 the sharpening kernel values need to be used (values of the first kernel),
- the interpolation function must be symmetric around the center point of the kernel,
- the slope in the center point is zero,
- the function is continuous in all points,
- the slope of a spline in the end point of a spline should be equal to the slope in the start point of an adjacent spline.

Other interpolation techniques can be use such as linear interpolation (with triangular function) etc. However, cubic spline approximation is preferred because it does not introduce undesired effects which could have a negative influence on the diagnosis.

BRIEF DESCRIPTION OF THE DRAWINGS

The present invention will now be described, by way of example, with reference to the drawings, in which.

DETAILED DESCRIPTION

Figure 1:
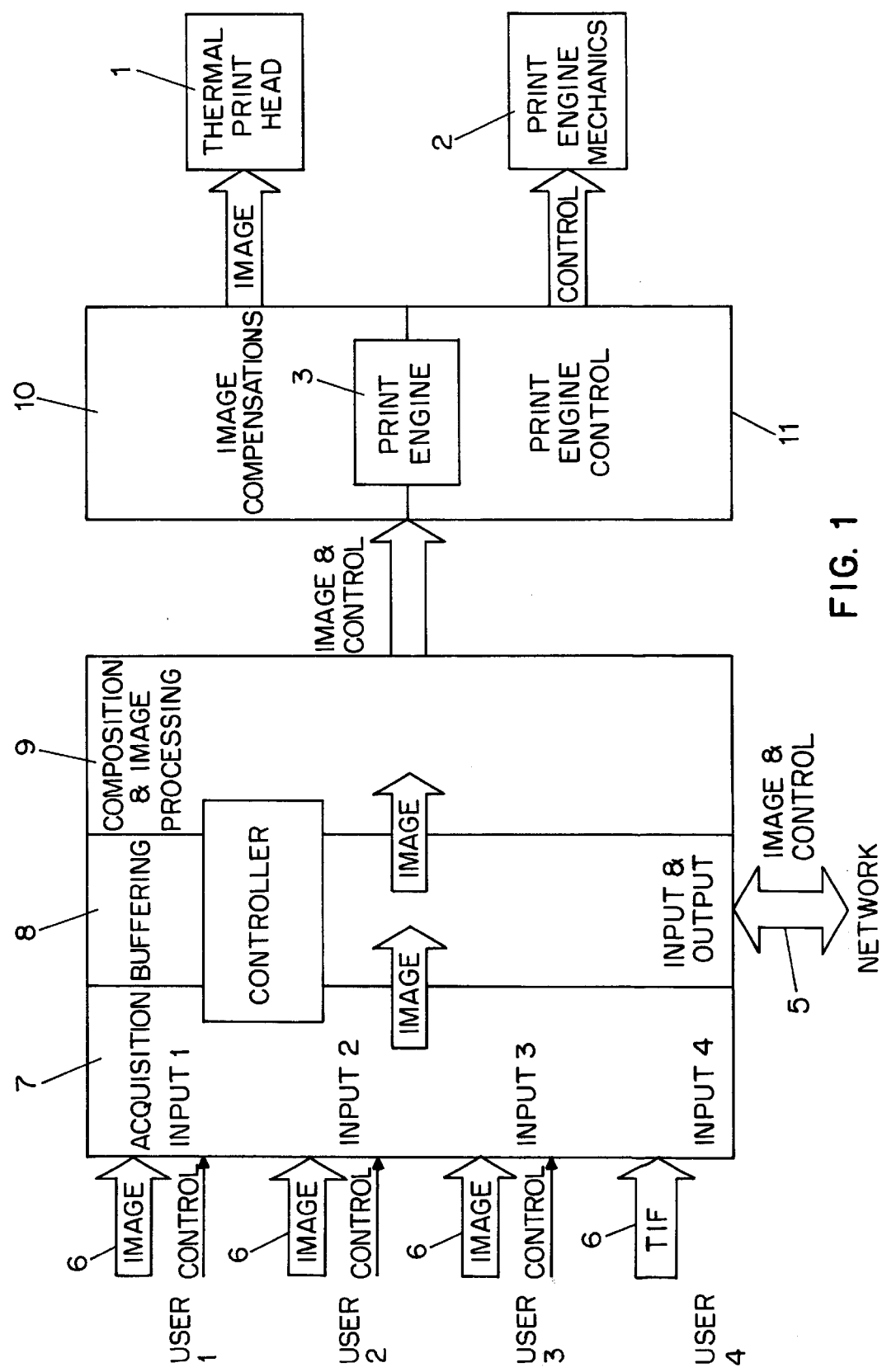
FIG. 1 is an overall block diagram illustrating operational elements of a thermal printer wherein the present invention can be applied.

In the block diagram of FIG. 1 the different operational blocks of a thermal printer for reproducing a medical image provided as a digital signal representation, are shown.

The thermal printer comprises four main blocks: a thermal print head indicated by numeral 1, print engine mechanics indicated by numeral 2, a print engine 3 and a controller 4.

Print engine mechanics 2 provide the movement of the thermal head 1 relative to a reproducing material.

Controller 4 controls the image acquisition, the image composition and the image processing. In this example controller 4 is a medical gateway controller that accepts different inputs.

An image to be printed can be fed to the medical gateway controller by two ways. Either the digital image representation is fed via network input 5 or via point-to-point inputs 6.

Point-to-point inputs are connections with single external image acquisition apparatus such as CT apparatus, US apparatus etc. In the described example four such inputs are provided, the inputs can take analog or digital image input. The point-to-point inputs are connected to image acquisition section 7 part of medical gateway controller 4.

Images input via acquisition section 7 or via network input 5 are buffered in buffer section 8 and further applied to composition and image processing section 9.

In image processing section 9 a desired lay-out is generated and the image processing according to this invention, i.e. combined scaling and interpolation, is performed.

For this purpose the image is twice convoluted by means of a convolution kernel, the elements of which are determined following the method described furtheron. For the second convolution the image is rotated by 90 degrees relative to its position when being convoluted a first time.

The processed image is then applied to the print engine 3. Print engine 3 comprises an image compensation section 10 and a print engine control section 11.

Compensations such as neighbour compensation performed in image compensation section 10 have been described in e.g. in European patent application-A-627 319.

Also commands necessary for film handling in the printer are generated in print engine control 11.

The image processing in image processing unit 9 is mainly executed by hardware. The hardware image processing accelerator circuit is in the following denoted by HIP (hardware image processor).

Figure 2:
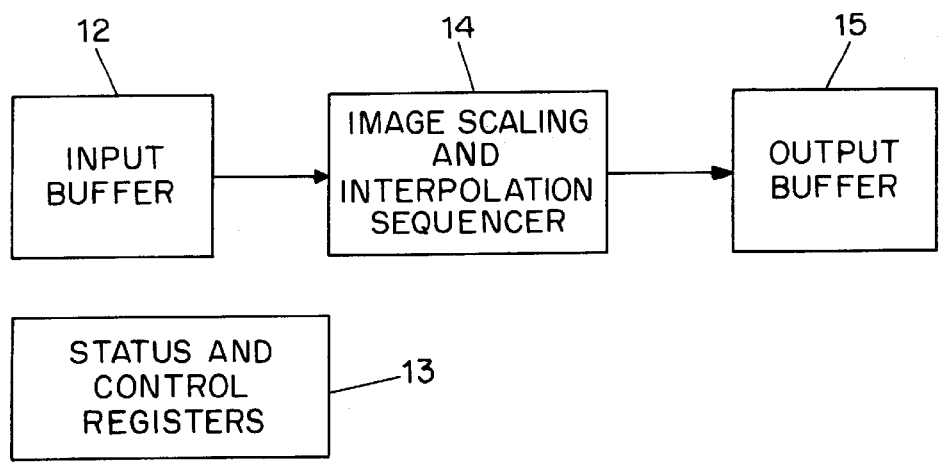
FIG. 2 illustrates the composition and the operation of a signal processing unit wherein the method of the present invention is performed.

FIG. 2 schematically shows the composition of the HIP.

The HIP basically comprises an input line buffer 12, status and control registers 13, an image scaling and interpolation sequencer 14, and an output line buffer 15.

The status and control register 13 and the input buffer 12 and output buffer 15 of the HIP are mapped into the memory map of an embedded computer.

The input and output buffers are organized as first in, first out buffers (FIFO).

The control registers allow the setting of a number of parameters such as the number of pixels per line in a reproduced image, the convolution values, the zoom ratio etc.

The system works on an image line basis, the number of pixels per line (input and output) is programmable.

In sequencer 14 the data stream between the input and the output FIFO (first in, first out) buffers is handled. The sequencer converts data stored in the input FIFO line buffer to a serial pixel stream at the required resolution. The data are then written into the output FIFO line buffer. The ratio between the input and the output clock depends on the interpolation (scaling) factor.

According to the present invention the scaling and interpolation is performed with a single programmable convolution kernel which in this embodiment comprises 8×16 values. The distance between each input pixel is divided into 15 subsample points.

The operation of the sequencer is basically as follows. The sequencer is first initialized by filling in the parameters such as line length, zoom ratio, convolution coefficients. The operation of the sequencer is then started. When the external input line buffer is filled, the sequencer will start to read input lines, calculate new pixel values by applying the method of the present invention and store the results in the output buffer. This process continues until the input buffer is empty and the output buffer is filled. This status change can be monitored by the processor.

The sequencer will resume operation as soon as the input buffer us full again and the output buffer is empty. In this way, the interpolation sequence will be ended at the end of the last line of the image when the input buffer isn't filled anymore.

In order to perform the image processing according to the invention, the image is passed twice through the HIP. The first time scaling and interpolation is performed in a first direction, e.g. horizontal direction in the image. During the second time, the image is rotated by 90 degrees and fed to the HIP so as to result in vertical scaling and interpolation.

When the two-dimensional process is split in a horizontal and a vertical pass, a one dimensional convolution vector is required.

In this example the convolution vector comprises 8×16 values that are calculated as follows:

first a set of 8 kernel values is determined that provides image sharpening when being applied to the image, next interpolation between the values of the so-called first set is performed.

The following example will illustrate this method.

The original image vector is $V_{org}$=(00001000). The mean smooth vector is:

$V_{smooth}$=(0.125 0.125 0.125 0.125 0.125 0.125 0.125 0.125)

Factor: k=0.75

The values defined by the sharpening filter are defined by $V_{sharp}$. Sharpening image vector is then equal to:

$V_{sharp}$=(−0.094 −0.094 −0.094 −0.094 1.656 −0.094 −0.094 −0.094)

The interpolation values are obtained by drawing a sin x/x like function through the 8 values by cubic spline approximation.

It is to be noted that because of the symmetry only 4 segments have to be calculated.

---

* first segment, interval 0 . . . 1
      $y1 = a1.x^3+b1.x^2+c1.x+d1$
          d1 = v0                . . . value for x = 0
          c1 = 0                 . . . slope is 0 for x = 0
          a1+b1+c1+d1 = v1      . . . value for x = 1
          $6.1.a1+2.b1 = 0$       . . . bendpoint for x = 1
* second segment, interval 1 . . . 2
      $y2 = a2.x^3+b2.x^2+c2.x+d2$
          a2+b2+c2+d2 = v1      . . . value for x = 1
          $3.a1.1^2+2.b1.1+c1 = 3.2.1^21+2.b2.1+c2$
                             . . . slope of 2 segments equal at x = 1
          $a2.2^3+b2.2^2+c2.2+d2 = v2$  . . . value for x = 2
          $6.2.a2+2.b2 = 0$       . . . bendpoint for x = 2
* third segment, interval 2 . . . 3
      $y3 = a3.x^3+b3.x^2+c3.2+d3 = v2$
          $a3.2^3+b3.2^2+c3.2+d3 = v2$  . . . value for x = 2
          $(3.a3.2^2+2.b3.2+c3) .A = 3.a2.2^2+b2.c2$
                             . . . slope of 2 segments equal at x = 2
          $a3.3^3+b3.3^2+c3.3+d3 = v3$  . . . value for x = 3
          $6.3.a3+2.b3 = 0$       . . . bendpoint for x = 3
* fourth segment, interval 3 . . . 4
      $y4 = a4.x^3+b4.x^2+c4.x+d4$
          $a4.3^3+b4.3^2+c4.3+d4 = v3$  . . . value for x = 3
          $3.a3.3^2+2.b3.3+c3 = 3.a4.3^2+2b4.3+c4$
                             . . . slope of 2 segments equal at x = 3
          $a4.4^3+b4.4^2+c4.4+d4 = 0$  . . . value for x = 4
          $3.a4.4^2+2.b4.4+c4 = 0$   . . . slope is 0 for x = 4
* interpolating points for half of the kernel
      vo=1.656     v1=−0.094     v2= −0.094     v3=−0.094

| segment 1 | segment 2 | segment 3 | segment 4 |
|---|---|---|---|
| 1.656 | −0.094 | −0.094 | −0.094 |
| 1.646 | −0.243 | −0.019 | −0.129 |
| 1.617 | −0.363 | 0.041 | −0.153 |
| 1.569 | −0.456 | 0.087 | −0.167 |
| 1.506 | −0.525 | 0.121 | −0.172 |
| 1.426 | −0.57 | 0.144 | −0.169 |
| 1.333 | −0.594 | 0.156 | −0.16 |
| 1.227 | −0.599 | 0.158 | −0.147 |
| 1.109 | −0.586 | 0.152 | −0.129 |
| 0.981 | −0.558 | 0.138 | −0.109 |
| 0.844 | −0.517 | 0.117 | −0.087 |
| 0.7 | −0.464 | 0.091 | −0.066 |
| 0.549 | −0.402 | 0.06 | −0.045 |
| 0.392 | −0.331 | 0.025 | −0.027 |
| 0.232 | −0.255 | 0.013 | −0.013 |
| 0.07 | −0.176 | 0.053 | 0 |

Figure 3:
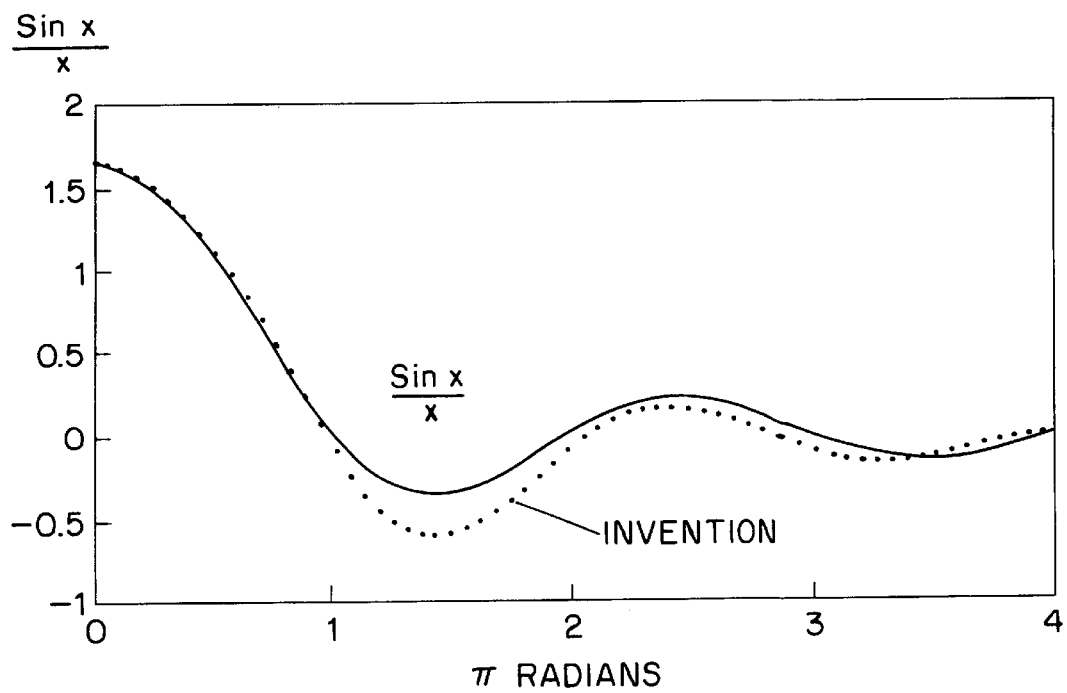
FIG. 3 is a graphical representation of a pure sin x/x function and the interpolation points (for half a kernel)

FIG. 3 shows a pure sin x/x function as well as the interpolation points for half of the kernel. (kernel values fo different segments) obtained by applying the method of the present invention.

What is claimed is:

1. An image processing method for resampling and sharpening an image comprising:

generating a first convolution kernel having first kernel elements that upon convolution with said image would generate a sharpened image, generating a second convolution kernel having second kernel elements wherein the generating of the second convolution kernel includes interpolating between the first kernel elements of said first convolution kernel, and convolving said image be means of said second convolution kernel.

2. An image processing method according to claim 1 wherein said image is a medical image.

3. An image processing method according to claim 1 wherein the interpolating includes generating an interpolation function through the first kernel elements of said first kernel.

4. An image processing method according to claim 3 wherein interpolation is performed by applying cubic spline approximation of said interpolation function through the elements of said first kernel.

5. An image processing method according to claim 3 wherein said interpolation function has the shape of a sin(x)/x function, wherein x is variable.

6. An image processing method according to claim 1 wherein said kernel elements are stored in a convolution look up table.

7. An image processing method according to claim 1 wherein said second convolution kernel is a one-dimensional kernel and wherein said convolving said image comprises a first and second convolution with said one-dimensional kernel, and wherein said image is rotated by 90 degrees during the second convolution relative to the first convolution.

* * * * *